United States Patent
Okura

(10) Patent No.: US 12,209,167 B2
(45) Date of Patent: Jan. 28, 2025

(54) POLY(3-HYDROXYBUTYRATE) RESIN SHEET FOR THERMOFORMING, MOLDED BODY FORMED FROM THE SHEET, AND METHODS FOR PRODUCING THE SHEET AND MOLDED BODY

(71) Applicant: KANEKA CORPORATION, Osaka (JP)

(72) Inventor: Tetsuo Okura, Settsu (JP)

(73) Assignee: KANEKA CORPORATION, Osaka (JP)

( * ) Notice: Subject to any disclaimer, the term of this patent is extended or adjusted under 35 U.S.C. 154(b) by 494 days.

(21) Appl. No.: 17/480,387

(22) Filed: Sep. 21, 2021

(65) Prior Publication Data

US 2022/0002510 A1    Jan. 6, 2022

Related U.S. Application Data

(63) Continuation of application No. PCT/JP2020/007707, filed on Feb. 26, 2020.

(30) Foreign Application Priority Data

Mar. 22, 2019  (JP) ................. 2019-054536

(51) Int. Cl.
  *C08J 5/18*    (2006.01)
  *B29B 11/10*   (2006.01)
  (Continued)

(52) U.S. Cl.
  CPC ......... *C08J 5/18* (2013.01); *B29B 11/10* (2013.01); *B29B 11/14* (2013.01); *B29C 51/002* (2013.01);
  (Continued)

(58) Field of Classification Search
  CPC ................... C08J 5/18; C08L 67/04
  See application file for complete search history.

(56) References Cited

U.S. PATENT DOCUMENTS

| 5,693,389 A | 12/1997 | Liggat |
| 2010/0152415 A1 | 6/2010 | Benson |
| 2017/0198136 A1 | 7/2017 | Minami et al. |

FOREIGN PATENT DOCUMENTS

| JP | 2002-248677 A | 9/2002 |
| JP | 2008-195044 A | 8/2008 |

(Continued)

OTHER PUBLICATIONS

Vandewijngaarden et al. "Gas Permeability Properties of Poly(3-hydroxybutyrate-co-3-hydroxyhexanoate)", Journal of Polymers and the Environment, vol. 22, (2014); pp. 501-507.*

(Continued)

*Primary Examiner* — Prashant J Khatri
(74) *Attorney, Agent, or Firm* — Oblon, McClelland, Maier & Neustadt, L.L.P.

(57) ABSTRACT

Provided is a resin sheet for thermoforming, the resin sheet containing a poly(3-hydroxybutyrate) resin. A difference between a melting point peak temperature and a melting point peak end temperature in differential scanning calorimetry analysis of the poly(3-hydroxybutyrate) resin is 10° C. or more. The sheet has a thickness of 0.15 to 1 mm. The melt viscosity of the poly(3-hydroxybutyrate) resin at 160° C. is preferably 10000 poise or more.

20 Claims, 1 Drawing Sheet

(51) Int. Cl.
| | |
|---|---|
| *B29B 11/14* | (2006.01) |
| *B29C 51/00* | (2006.01) |
| *B29C 51/10* | (2006.01) |
| *B29C 51/42* | (2006.01) |
| *B29K 67/00* | (2006.01) |
| *B29L 31/00* | (2006.01) |
| *B65D 1/26* | (2006.01) |
| *B65D 25/04* | (2006.01) |
| *B65D 43/02* | (2006.01) |
| *C08L 67/04* | (2006.01) |

(52) U.S. Cl.
CPC ............ *B29C 51/10* (2013.01); *B29C 51/421* (2013.01); *B65D 1/26* (2013.01); *B65D 25/04* (2013.01); *B65D 43/02* (2013.01); *C08L 67/04* (2013.01); *B29K 2067/04* (2013.01); *B29L 2031/712* (2013.01); *C08J 2367/04* (2013.01); *C08J 2467/04* (2013.01); *C08L 2201/06* (2013.01); *C08L 2203/30* (2013.01); *C08L 2205/025* (2013.01)

(56) References Cited

FOREIGN PATENT DOCUMENTS

| | | | |
|---|---|---|---|
| JP | 2008-195045 A | 8/2008 | |
| JP | 2011-093205 A | 5/2011 | |
| JP | 2012-121261 A | 6/2012 | |
| WO | WO 2015/146194 A1 | 10/2015 | |
| WO | WO-2015187924 A1 * | 12/2015 | ........... B29C 51/002 |

OTHER PUBLICATIONS

International Search Report dated May 19, 2020, in PCT/JP2020/007707, filed Feb. 26, 2020.

Biodegradable Plastics & Marine Litter, United Nations Environment Programme 2015.

Office Action issued Aug. 2, 2024, in corresponding Chinese Patent Application No. 202080021612.2 (with English Translation), 16 pages.

"Polymer Physics," edited by Meili Zao, pp. 76-79, Beijing University of Aeronautics and Astronautics Press, 2005 1st edition, 1st printing, Sep. 2005, 8 pages.

"Processing of Polymer Materials (Second Edition)," edited by Wen Changying, p. 33, China Light Industry Press, 2nd edition, 1st printing, Jun. 2016, 7 pages.

* cited by examiner

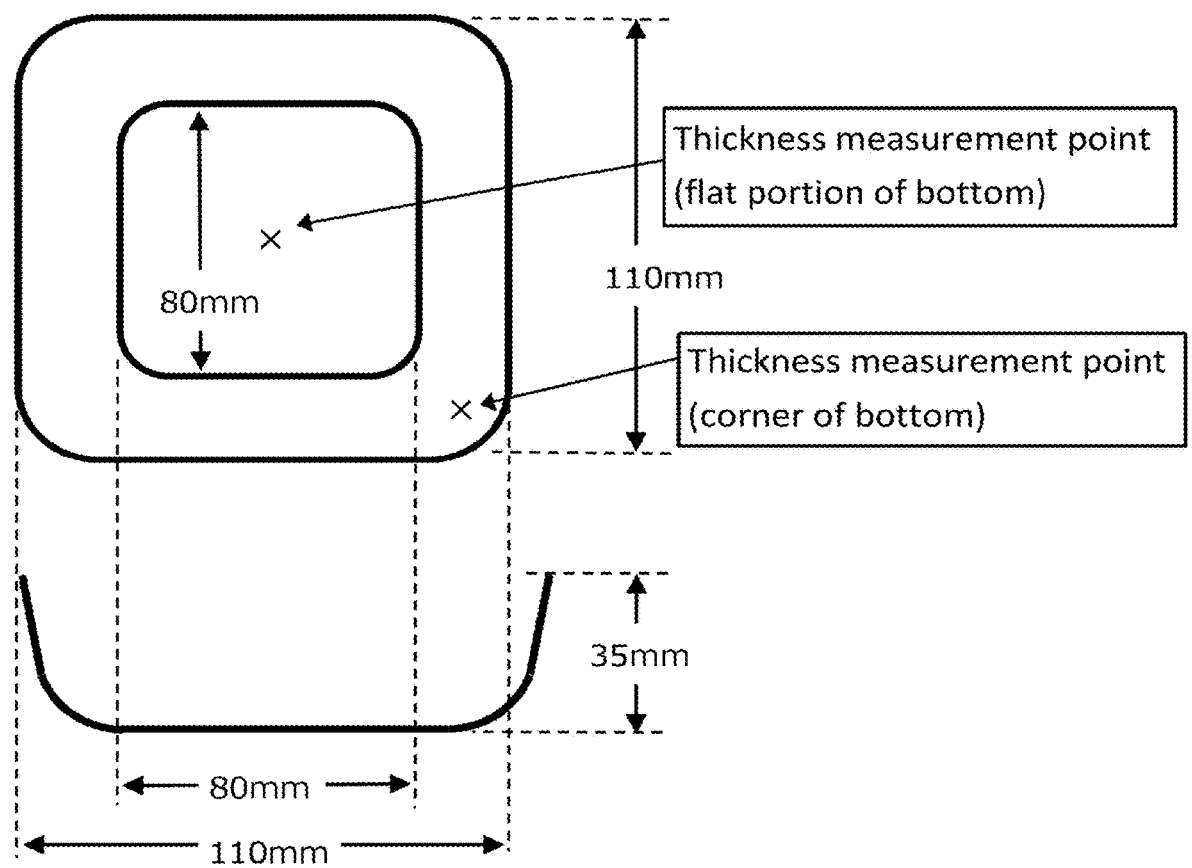

POLY(3-HYDROXYBUTYRATE) RESIN SHEET FOR THERMOFORMING, MOLDED BODY FORMED FROM THE SHEET, AND METHODS FOR PRODUCING THE SHEET AND MOLDED BODY

CROSS-REFERENCE TO RELATED APPLICATIONS

This application is a continuation of International Application No. PCT/JP2020/007707, filed Feb. 26, 2020, and claims priority to Japanese Application No. 2019-054536, filed Mar. 22, 2019, the disclosures of all of which are incorporated herein by reference in their entireties.

TECHNICAL FIELD

The present invention relates to a poly(3-hydroxybutyrate) resin sheet for thermoforming, a molded body formed from the sheet, and methods for producing the sheet and molded body.

BACKGROUND ART

In recent years, separate collection and composting of raw garbage have been promoted especially in Europe, and plastic products that can be composted together with raw garbage have been desired. An example of such plastic products is disclosed in Patent Literature 1. The product of Patent Literature 1 is one into which a sheet made of a polylactic acid polymer is processed by thermoforming.

In the meantime, environmental problems caused by waste plastics are becoming issues of great concern. In particular, it has been found that a huge amount of plastics dumped into seas or carried into seas through rivers are drifting in all oceans on the Earth. Such plastics, which retain their shapes for a long period of time, are pointed out as having various harmful effects on the ecosystems, and examples of plastics-induced problems include: a phenomenon called ghost fishing where plastics catch or trap marine creatures; and eating disorder that marine creatures having ingested plastics suffer due to the plastics remaining in their digestive organs.

There is also known a problematic phenomenon where plastics are broken into microplastic particles by the action of ultraviolet rays or any other cause, the microplastic particles adsorb hazardous substances present in seawater, and marine creatures ingest the microplastic particles with the adsorbed hazardous substances, so that the hazardous substances are introduced into the food chain.

The use of biodegradable plastics is expected as means for addressing the plastics-induced marine pollution as described above. However, a report issued by the United Nations Environment Programme in 2015 (Non Patent Literature 1) states that plastics such as polylactic acid that can be biodegraded through composting are not expected to be degraded quickly in the actual oceans whose temperatures are low and cannot therefore be used to address the marine pollution.

Under these circumstances, poly(3-hydroxybutyrate) resins, which can be readily biodegraded even in seawater, are attracting attention as a promising solution to the above problems.

Patent Literature 2 teaches a polyester resin composition containing two polyhydroxyalkanoates and describes a film and a sheet as exemplary molded products of the composition. This literature describes producing a sheet having a thickness of 100 μm.

There is also known a method for forming a resin sheet into a container such as a food container which has a central cavity by subjecting the resin sheet to thermoforming such as vacuum forming. Patent Literature 2 mentions thermoforming; however, this literature fails to describe, or give any consideration to, actually performed thermoforming.

CITATION LIST

Patent Literature

PTL 1: Japanese Laid-Open Patent Application Publication No. 2002-248677
PTL 2: WO 2015/146194

Non-Patent Literature

NPL 1: BIODEGRADABLE PLASTICS & MARINE LITTER, United Nations Environment Programme 2015

SUMMARY OF INVENTION

Technical Problem

Investigations by the present inventors have revealed that when a sheet made of a poly(3-hydroxybutyrate) resin is processed into a molded body such as a container having a deep cavity by subjecting the sheet to thermoforming, the sheet could have a locally thinned region and fail to serve sufficiently to result in the molded body having a high strength or the resulting molded body could have shape defects or appearance defects such as a rough surface.

In view of the above circumstances, the present invention aims to provide a poly(3-hydroxybutyrate) resin sheet for thermoforming, the resin sheet being quickly degradable even in seawater and formable into a molded body having a relatively uniform thickness and a good appearance by thermoforming.

Solution to Problem

As a result of intensive studies with the goal of solving the above problems, the present inventors have found that a sheet that is made of a poly(3-hydroxybutyrate) resin exhibiting a particular crystalline melting behavior and that has a predetermined thickness is quickly degradable even in seawater and thermoformable into a molded body having a relatively uniform thickness and a good appearance even in the case where the molded body is one having a deep cavity. Based on this finding, the inventors have completed the present invention.

Specifically, the present invention relates to a poly(3-hydroxybutyrate) resin sheet for thermoforming, containing a poly(3-hydroxybutyrate) resin, wherein a difference between a melting point peak temperature and a melting point peak end temperature in differential scanning calorimetry analysis of the poly(3-hydroxybutyrate) resin is 10° C. or more, and the sheet has a thickness of 0.15 to 1 mm. The melt viscosity of the poly(3-hydroxybutyrate) resin at 160° C. is preferably 10000 poise or more. The poly(3-hydroxybutyrate) resin is preferably poly(3-hydroxybutyrate-co-3-hydroxyhexanoate).

The present invention further relates to a method for producing the poly(3-hydroxybutyrate) resin sheet, the method including the step of melting a poly(3-hydroxybutyrate) resin in an extruder and then extruding the molten resin from a T-die.

The present invention further relates to a method for producing the poly(3-hydroxybutyrate) resin sheet, the method including the step of melting the poly(3-hydroxybutyrate) resin between heating rolls and then processing the molten resin into the sheet.

The present invention further relates to a molded body produced by thermoforming of the poly(3-hydroxybutyrate) resin sheet and to a method for producing a molded body, the method including the step of preheating the poly(3-hydroxybutyrate) resin sheet to a temperature between the melting point peak temperature and the melting point peak end temperature in the differential scanning calorimetry analysis of the poly(3-hydroxybutyrate) resin, and then molding the preheated sheet. The molding is preferably accomplished by a vacuum forming process, a compressed-air forming process, or a vacuum/compressed-air forming process.

Advantageous Effects of Invention

The present invention can provide a poly(3-hydroxybutyrate) resin sheet for thermoforming, the resin sheet being quickly degradable even in seawater and formable into a molded body having a relatively uniform thickness and a good appearance by thermoforming.

BRIEF DESCRIPTION OF DRAWINGS

The FIGURE shows top and vertical cross-sectional views illustrating the shape of a mold used for thermoforming in Examples and Comparative Examples.

DESCRIPTION OF EMBODIMENTS

Hereinafter, embodiments of the present invention will be described. The present invention is not limited to the embodiments described below.

The poly(3-hydroxybutyrate) resin in the present invention is an aliphatic polyester resin producible by microorganisms and containing 3-hydroxybutyrate as a repeating unit. The poly(3-hydroxybutyrate) resin may be poly(3-hydroxybutyrate) which contains only 3-hydroxybutyrate as the repeating unit or may be a copolymer of 3-hydroxybutyrate and another hydroxyalkanoate. The poly(3-hydroxybutyrate) resin may be a mixture of a homopolymer and one or more copolymers or a mixture of two or more copolymers.

Specific examples of the poly(3-hydroxybutyrate) resin include poly(3-hydroxybutyrate), poly(3-hydroxybutyrate-co-3-hydroxyhexanoate), poly(3-hydroxybutyrate-co-3-hydroxyvalerate), poly(3-hydroxybutyrate-co-4-hydroxybutyrate), poly(3-hydroxybutyrate-co-3-hydroxyoctanoate), and poly(3-hydroxybutyrate-co-3-hydroxyoctadecanoate). Among these, poly(3-hydroxybutyrate), poly(3-hydroxybutyrate-co-3-hydroxyhexanoate), poly(3-hydroxybutyrate-co-3-hydroxyvalerate), and poly(3-hydroxybutyrate-co-4-hydroxybutyrate) are preferred as they are easy to industrially produce.

Poly(3-hydroxybutyrate-co-3-hydroxyhexanoate) is more preferred for the following reasons: the ratio between the repeating units can be varied to change the melting point and crystallinity and adjust the physical properties such as the Young's modulus and heat resistance to levels intermediate between those of polypropylene and polyethylene; and this plastic is easy to industrially produce as mentioned above and useful in terms of physical properties. Poly(3-hydroxybutyrate) resins have the property of being thermally decomposed easily under heating to 180° C. or higher and, in particular, the melting point of poly(3-hydroxybutyrate-co-3-hydroxyhexanoate) can be lowered to enable a molding process at low temperature. Poly(3-hydroxybutyrate-co-3-hydroxyhexanoate) is preferred also in this respect.

As for the ratio between the repeating units of poly(3-hydroxybutyrate-co-3-hydroxyhexanoate), the 3-hydroxybutyrate unit/3-hydroxyhexanoate unit ratio is preferably from 80/20 to 99/1 (mol/mol) and more preferably from 75/15 to 97/3 (mol/mol) in terms of the balance between flexibility and strength. This is because the ratio is preferably 99/1 or less in terms of flexibility and because the ratio is preferably 80/20 or more in order for the resin to have a suitable hardness.

An example of commercially-available poly(3-hydroxybutyrate-co-3-hydroxyhexanoate) is "Kaneka Biodegradable Polymer PHBH™" manufactured by Kaneka Corporation.

As for poly(3-hydroxybutyrate-co-3-hydroxyvalerate), although its physical properties such as the melting point and Young's modulus can be changed depending on the ratio between the 3-hydroxybutyrate component and the 3-hydroxyvalerate component, the crystallinity of poly(3-hydroxybutyrate-co-3-hydroxyvalerate) is as high as 50% or more because the two components are co-crystallized. Thus, poly(3-hydroxybutyrate-co-3-hydroxyvalerate), albeit being more flexible than poly(3-hydroxybutyrate), cannot offer sufficient improvement in terms of brittleness.

A technique commonly used to form a resin sheet into a molded body such as a container is thermoforming in which the sheet is preheated and then shaped using a mold. In such thermoforming, the edges of the sheet are fixed with clamps or pins, the sheet is preheated and softened by means such as a far-infrared heater, and then the softened sheet is closely fitted to the contour of the mold with the aid of vacuum, compressed air, or both. In this forming process, insufficient preheating leads to a failure to properly fit the sheet to the contour of the mold, resulting in a poorly shaped molded body. However, if the sheet is preheated to such a degree that the tension of the softened resin is extremely low, the softened resin could have a locally thinned region, which causes reduced strength of the molded body. This problem is serious especially when the softened resin needs to be stretched to a great extent, such as when the sheet is thermoformed into a container having a deep cavity.

To endow the sheet with good thermoformability, the present invention is characterized in that the poly(3-hydroxybutyrate) resin used is one which, when subjected to differential scanning calorimetry analysis, exhibits a difference of 10° C. or more between a melting point peak temperature and the melting point peak end temperature. This is because, in the case where the temperature difference is 10° C. or more, it is easy to melt the poly(3-hydroxybutyrate) resin while allowing some crystals to remain unmelted. Thus, in thermoforming of the sheet, the sheet can be preheated sufficiently for shaping and, at the same time, the sheet can be uniformly stretched during shaping thanks to the tension retained by the remaining crystals. As such, the thermoforming of the sheet can yield a molded body having a relatively uniform thickness.

The temperature difference is more preferably 12° C. or more, more preferably 15° C. or more, and even more preferably 18° C. or more. The upper limit of the temperature difference is 70° C. or less. In terms of the ease of production of the poly(3-hydroxybutyrate) resin, the temperature difference is preferably 50° C. or less, more preferably 40° C. or less, even more preferably 35° C. or less, and still even more preferably 30° C. or less.

In the present invention, the melting point peak temperature and the melting point peak end temperature in differential scanning calorimetry analysis are defined as follows: An aluminum pan is charged with 4 to 10 mg of a resin sample; the resin sample is subjected to differential scanning calorimetry analysis which uses a differential scanning calorimeter and in which the resin sample is melted under a stream of nitrogen by increasing the temperature from 30 to 180° C. at a rate of 10° C./min; and in the endothermic curve obtained by the calorimetry, the temperature at which the amount of absorbed heat reaches a maximum is determined as the melting point peak temperature, and the temperature which is higher than the melting point peak temperature and at which the melting point peak ends and the endothermic process ceases to be observed is determined as the melting point peak end temperature. The melting point peak temperature and melting point peak end temperature are measured for the total poly(3-hydroxybutyrate) resin contained in the poly(3-hydroxybutyrate) resin sheet.

A poly(3-hydroxybutyrate) resin that exhibits a broad melting point peak and that contains a high-melting component can be used as the poly(3-hydroxybutyrate) resin for which the temperature difference between the melting point peak temperature and the melting point peak end temperature is 10° C. or more. The poly(3-hydroxybutyrate) resin that exhibits a broad melting point peak and that contains a high-melting component and another poly(3-hydroxybutyrate) resin having different melting point properties can be used in combination.

The details of how to produce the poly(3-hydroxybutyrate) resin that exhibits a broad melting point peak and that contains a high-melting component are described, for example, in WO 2015/146194.

The melt viscosity of the poly(3-hydroxybutyrate) resin of the present invention at 160° C. is preferably 10000 poise or more. The use of such a poly(3-hydroxybutyrate) resin having a high melt viscosity can reduce the occurrence of a drawdown phenomenon where the sheet of the present invention sags due to its own weight during the preheating step in thermoforming of the sheet. This makes it possible to produce a molded body having a good appearance from the sheet even when the sheet has a large area. The melt viscosity is more preferably 11000 poise or more, more preferably 12000 poise or more, and even more preferably 13000 poise or more. The upper limit of the melt viscosity is not limited to a particular value. In terms of the surface smoothness of the sheet and the prevention of excessive loads on an extruder and heating rolls which will be described later, the melt viscosity is preferably 30000 poise or less.

The poly(3-hydroxybutyrate) resin sheet for thermoforming of the present invention may contain an additional resin in addition to the poly(3-hydroxybutyrate) resin so long as the additional resin does not impair the effect of the present invention. Examples of the additional resin include: aliphatic polyester resins such as polybutylene succinate adipate, polybutylene succinate, polycaprolactone, and polylactic acid; and aliphatic-aromatic polyester resins such as polybutylene adipate terephthalate, polybutylene sebacate terephthalate, and polybutylene azelate terephthalate. The poly(3-hydroxybutyrate) resin sheet may contain one additional resin or two or more additional resins.

The content of the additional resin is not limited to a particular range, but is preferably 30 parts by weight or less and more preferably 20 parts by weight or less per 100 parts by weight of the poly(3-hydroxybutyrate) resin. The lower limit of the content of the additional resin is not limited to a particular value, and the content of the additional resin may be 0 parts by weight.

The poly(3-hydroxybutyrate) resin sheet for thermoforming of the present invention may contain an additive usable with the poly(3-hydroxybutyrate) resin so long as the additive does not impair the effect of the present invention. Examples of the additive include: inorganic fillers such as talc, calcium carbonate, mica, and silica; colorants such as a pigment and a dye; odor absorbers such as activated carbon and zeolite; and flavors such as vanillin and dextrin. Other examples of the additive include a plasticizer, an oxidation inhibitor, an antioxidant, a weather resistance improver, an ultraviolet absorber, a crystal nucleating agent, a lubricant, a mold release, a water repellent, an antimicrobial, and a slidability improver. The poly(3-hydroxybutyrate) resin sheet may contain one additive or two or more additives. The content of the additive can be set as appropriate by those skilled in the art depending on the intended purpose.

The thickness of the poly(3-hydroxybutyrate) resin sheet for thermoforming of the present invention is from 0.15 to 1 mm in order that uniform preheating may be achieved in thermoforming to produce a molded body having a relatively uniform thickness and a good appearance and that the resulting molded body may have desired stiffness and a reduced weight. If the thickness of the sheet is below the above range, the molded body obtained by thermoforming of the sheet suffers appearance defects such as wrinkles and a rough surface. If the thickness of the sheet is beyond the above range, it is difficult to preheat the sheet sufficiently for shaping and at the same time obtain a molded body having a relatively uniform thickness and a good appearance. The thickness of the sheet is preferably from 0.16 to 0.8 mm and more preferably from 0.2 to 0.6 mm.

The following describes a method for producing the poly(3-hydroxybutyrate) resin sheet for thermoforming of the present invention.

The poly(3-hydroxybutyrate) resin sheet for thermoforming of the present invention can be produced, for example, by melting and kneading the poly(3-hydroxybutyrate) resin in an extruder, then extruding the resin from a T-die coupled to the outlet of the extrude, and then cooling the extrudate on a cooling roll or sandwiching the extrudate between two cooling rolls.

Alternatively, the poly(3-hydroxybutyrate) resin sheet for thermoforming of the present invention can be produced, for example, by melting and kneading the poly(3-hydroxybutyrate) resin between a plurality of heating rolls and then passing the resin on one cooling roll or between two or more cooling rolls or pressing the resin to obtain a sheet.

In general, the poly(3-hydroxybutyrate) resin has a much lower crystallization speed than other crystalline resins such as polypropylene. Thus, the poly(3-hydroxybutyrate) resin tends to fail in fully solidifying into a crystalline solid on the cooling roll surface and adhere to the cooling roll surface. Thus, the temperature of the cooling roll is preferably from 40 to 60° C. in order to accelerate the crystallization of the poly(3-hydroxybutyrate) resin and achieve quick solidification of the poly(3-hydroxybutyrate) resin.

The poly(3-hydroxybutyrate) resin sheet for thermoforming of the present invention is used for thermoforming into a molded body such as a container. As previously stated, the thermoforming can be carried out by preheating and softening the sheet and closely fitting the softened sheet to the contour of a mold with the aid of vacuum and/or compressed air. Specific examples of the thermoforming include vacuum forming, compressed-air forming, vacuum/compressed-air forming, matched mold forming, plug assist forming, and TOM forming. Vacuum forming, compressed-air forming, or vacuum/compressed-air forming is preferred because these forming processes are simple and can be carried out using inexpensive molds.

The temperature to which the sheet is preheated can be set as appropriate by those skilled in the art. Preferably, the temperature is between the melting point peak temperature and the melting point peak end temperature in differential scanning calorimetry analysis of the poly(3-hydroxybutyrate) resin. When the sheet is preheated to such a temperature, it is possible to melt the poly(3-hydroxybutyrate) resin while allowing some crystals to remain unmelted. This can ensure both sufficient preheating for shaping and uniform stretching owing to the remaining crystals, leading to production of a molded body having a relatively uniform thickness.

The device used to preheat the sheet to the above temperature is not limited to a particular type, and examples of the device include a far-infrared heater, a hot wire heater, and a hot air heater. Among these, a far-infrared heater is preferred because with the use of it, quick and uniform heating can easily be achieved. In the case where a far-infrared heater is used, it is common practice to set the temperature of the heater to a value higher than the target sheet temperature and control the temperature of the sheet by adjusting the distance between the heater and sheet and the preheating time. An exemplary method is to set the temperature of the far-infrared heater in the range of 300 to 350° C., place the heater at a distance of 10 to 50 cm from the sheet, and heat the sheet with the heater for 5 to 30 seconds. Examples of the method for measuring the actual temperature of the sheet include a method in which the actual temperature is measured by a non-contact infrared thermometer and a method in which Thermolabel whose color changes depending on the temperature is attached to the sheet and the preheating conditions are set.

The molded body obtained by thermoforming of the poly(3-hydroxybutyrate) resin sheet for thermoforming of the present invention is not limited to a particular type, and examples of the molded body include: a container having a central cavity; a container having a partition; a container having a folded portion around the opening of the container; a lid having a central recess or protrusion; and a lid having a curved or stepped structure along a part or all of its periphery.

EXAMPLES

Hereinafter, the present invention will be described more specifically using examples and comparative examples. The present invention is not limited by the examples in any respect.
(Resin Materials Used)
Resin material 1: Kaneka Biodegradable Polymer PHBH™ 151C
Poly(3-hydroxybutyrate-co-3-hydroxyhexanoate), manufactured by Kaneka Corporation
Resin material 2: Kaneka Biodegradable Polymer PHBH™ X131A
Poly(3-hydroxybutyrate-co-3-hydroxyhexanoate), manufactured by Kaneka Corporation
(Evaluation by Differential Scanning Calorimetry Analysis)
An aluminum pan was charged with 4 to 10 mg of a resin sample, and the resin sample was subjected to differential scanning calorimetry analysis which used a differential scanning calorimeter and in which the resin sample was melted under a stream of nitrogen by increasing the temperature from 30 to 180° C. at a rate of 10° C./min. In the endothermic curve obtained by the calorimetry, the temperature at which the amount of absorbed heat reached a maximum was determined as the melting point peak temperature, and the temperature which was higher than the melting point peak temperature and at which the melting point peak ended and the endothermic process ceased to be observed was determined as the melting point peak end temperature.
(Method for Measuring Melt Viscosity)
An orifice with an opening diameter of 1 mm, a length of 10 mm, and an entrance angle of 45° was attached to Capilograph (cylinder diameter: 10 mm), which was heated to 160° C. This Capilograph was charged with 15 g of a resin sample, and the resin sample was preheated for 5 minutes. After that, the piston was lowered at a speed of 10 mm/min to extrude the molten resin through the orifice. The melt viscosity at a shear rate of 122/s was calculated from the stress applied to the piston during the extrusion.
(Evaluation of Sheet Thickness)

The thickness of the sheet was measured with a caliper at three points, in particular the opposite ends and center of the sheet in the width direction. The sheet thickness was calculated as an arithmetic mean of the three measurement values.
(Evaluation of Biodegradability of Sheet in Seawater)
A plastic container was charged with 6 L of seawater (acquired at a harbor site in Takasago, Hyogo) from which foreign matter was removed with a sieve with a mesh size of 80 μm. 3 g of ammonium chloride and 0.6 g of dipotassium phosphate were also placed into the container according to ASTM D-7081. The sheet cut into a 50 mm×50 mm piece was introduced into the contents of the container and left for three months, after which the weight retention of the sheet was calculated. The temperature of the seawater was maintained at 23° C.
(Method for Sheet Thermoforming)
Sheet thermoforming was carried out using a vacuum forming machine. First, the sheet was fixed to a frame in the shape of a square 200 or 300 mm on a side, and Thermolabel was attached to the center of the sheet. Next, the sheet was preheated in a preheating chamber in which a far-infrared heater was set to 350° C. until the temperature indicated by the Thermolabel (preheating temperature) reached a predetermined temperature. Subsequently, a mold was plunged on the sheet from below and thus made in contact with the sheet. Vacuuming was then performed through a hole located at the bottom of the mold to fit the sheet closely to the contour of the mold and thus form the sheet into the shape of a container, and the mold was removed. In this manner, a molded body was obtained. The mold used in this evaluation was one for producing a rounded square container having a 110 mm×110 mm opening and a depth of 35 mm. The bottom of the mold was in the shape of a rounded square having a size of 80 mm×80 mm and rounded corners with a radius of curvature R of 10 mm, and the mold had curved portions with a radius of curvature R of 10 mm not only in the bottom but also in the side walls. Schematic views illustrating the shape of the mold are shown in the FIGURE.
(Evaluation of Thermoformability of Sheet)
In the molded body obtained by the above thermoforming, the corners of the bottom were stretched and thinned to the greatest extent. Thus, one of the corners of the bottom of the container and a central flat portion of the bottom of the container were cut out, and the thicknesses of the cut-out pieces were measured with a caliper. The thickness ratio was calculated by Equation 1 given below, and an evaluation was made according to the criteria listed below.

Thickness ratio=(Thickness of corner of bottom)/(Thickness of flat portion of bottom)  Equation 1

Good: The thickness ratio is 0.5 or more
Poor: The thickness ratio is less than 0.5
(Evaluation of Molded Body)
The appearance of the molded body obtained by the above thermoforming was inspected and evaluated according to the criteria listed below.
Good: The molded body had a shape identical to that of the mold and was free of appearance defects such as wrinkles and a rough surface.
Average: The molded body had slight wrinkles.
Poor: The molded body had shape defects or appearance defects such as wrinkles and a rough surface.
[Production of Poly(3-Hydroxybutyrate) Resin Pellets]
The resin materials 1 and 2 were mixed in proportions shown in Table 1, then 1 part by weight of pentaerythritol was added to the mixture per 100 parts by weight of the total of the two resin materials, and the mixture and pentaerythritol were dry-blended. The resulting resin material was placed into a parallel twin-screw extruder having a screw diameter of 26 mm and having cylinder and die temperatures set to 150° C., and was extruded into a strand. The strand was solidified by passing it through a water bath filled with hot water at 45° C., and the solidified strand was cut by a pelletizer to obtain resin pellets 1, 2, and 4.

Another resin material obtained in the manner as described above was placed into the above twin-screw extruder having a cylinder temperature set to 190° C. and a die temperature set to 150° C., and was extruded into a strand. The strand was solidified by passing it through a water bath filled with hot water at 45° C., and the solidified strand was cut by a pelletizer to obtain resin pellets 3. The production conditions and the melting point properties of the different resin pellets are shown in Table 1.

TABLE 1

|  | Material proportions | | | Melting point properties | | | |
| --- | --- | --- | --- | --- | --- | --- | --- |
|  | Resin material 1 (parts by weight) | Resin material 2 (parts by weight) | Cylinder temperature (° C.) | Peak temperature (° C.) | End temperature (° C.) | Difference between peak temperature and end temperature (° C.) | Melt viscosity (poise) |
| Resin pellets 1 | 25 | 75 | 150 | 138 | 162 | 24 | 13,600 |
| Resin pellets 2 | 50 | 50 | 150 | 137 | 165 | 28 | 13,900 |
| Resin pellets 3 | 50 | 50 | 190 | 139 | 165 | 26 | 8,800 |
| Resin pellets 4 | 0 | 100 | 150 | 140 | 148 | 8 | 12,800 |

Example 1

A T-die with a width of 500 mm was coupled to a single-screw extruder having a screw diameter of 40 mm, and the cylinder and die temperatures of the extruder were set to 160° C. The resin pellets 1 were placed into the extruder and extruded into a sheet shape. The extrudate was held between two cooling rolls located below the T-die, and the edges of the extrudate in the width direction were slit to give a sheet having a width of 310 mm and a thickness of 0.31 mm. In the evaluation of the thermoformability of the sheet, the sheet was preheated to a preheating temperature of 140° C. and subjected to thermoforming using a square frame 300 mm on a side. The evaluation result is shown in Table 2.

Example 2

A sheet was obtained and evaluated for thermoformability in the same manner as in Example 1, except that the resin pellets used for the processing were changed to the resin pellets 2. The evaluation result is shown in Table 2.

Example 3

A sheet was obtained and evaluated for thermoformability in the same manner as in Example 2, except that the sheet thickness was 0.16 mm. The evaluation result is shown in Table 2.

Example 4

A sheet was obtained in the same manner as in Example 1, except that the resin pellets used for the processing were changed to the resin pellets 3 and that the cylinder and die temperatures of the extruder were set to 155° C. The sheet thermoformability was evaluated in the same manner as in Example 1, except that the thermoforming was carried out using not only a square frame 300 mm on a side but also a square frame 200 mm on a side. The evaluation result is shown in Table 2.

Example 5

A twin-roll machine having two 8-inch-diameter rolls was used. The roll temperatures were set to 145° C., and the roll rotational speeds were set to 20 rpm and 18 rpm. The resin pellets 2 were fed to the rolls, and after the pellets were attached around the rolls, the pellets were kneaded for 2 minutes. After that, the kneaded material was cut into a piece, which was held between two iron plates and cooled. The cooled material was cut to obtain a sheet having a size of 310 mm×310 mm and a thickness of 0.71 mm. The sheet thermoformability was evaluated in the same manner as in Example 1, except that the preheating temperature of the sheet was changed to 150° C. The evaluation result is shown in Table 2.

Comparative Example 1

A sheet was obtained in the same manner as in Example 1, except that the resin material used for the processing was changed to polylactic acid (Ingeo 10361D, manufactured by NatureWorks LLC.) and that the cylinder and die temperatures of the extruder were set to 170° C. The sheet thermoformability was evaluated in the same manner as in Example 1, except that the preheating temperature of the sheet was changed to 150° C. The evaluation result of the sheet is shown in Table 2.

Comparative Example 2

A sheet was obtained and evaluated for thermoformability in the same manner as in Example 1, except that the resin pellets 4 were used. The evaluation result is shown in Table 2.

Comparative Example 3

A sheet was obtained and evaluated for thermoformability in the same manner as in Example 1, except that the resin pellets 2 were used and that the screw rotational speed was adjusted to give a sheet thickness of 0.10 mm. The evaluation result is shown in Table 2.

Comparative Example 4

A sheet was obtained in the same manner as in Example 1, except that the resin pellets 2 were used and that the sheet drawing speed was adjusted to give a sheet thickness of 1.13 mm. In the evaluation of the thermoformability of the sheet, thermoforming was carried out in two ways, in one of which the sheet was preheated with the preheating temperature set to 150° C., and in the other of which the sheet was preheated with the preheating temperature set to 160° C. The evaluation result is shown in Table 2 larger square frame 300 mm on a side suffered drawdown to a relatively great extent during preheating and yielded a molded body having slight wrinkles. This demonstrates that thermoforming over a large area can be successfully achieved when a poly(3-hydroxybutyrate) resin having a melt viscosity as high as more than 10000 poise is used as in Examples 1, 2, 3, and 5.

In contrast, in the case where a molded body was obtained using the resin sheet for thermoforming of Comparative Example 2 where the difference between the melting point peak temperature and melting point peak end temperature in the resin material used was less than 10° C., the corners of the bottom of the molded body were significantly thinner than the rest of the molded body.

In Comparative Example 3 where the thickness of the resin sheet for thermoforming was as small as 0.10 mm, wrinkles were formed during mold release in the corners of

TABLE 2

| | | Sheet thickness | Degradability in seawater Weight retention | Frame size | Preheating temperature | Thickness of corner of bottom | Thickness of flat portion of bottom | Thickness | | Evaluation of molded body | |
|---|---|---|---|---|---|---|---|---|---|---|---|
| | Resin pellets | (mm) | (%) | (mm) | (° C.) | (mm) | (mm) | ratio | Rating | Rating | Notes |
| Example 1 | Resin pellets 1 | 0.31 | 0 | 300 | 140 | 0.13 | 0.22 | 0.59 | Good | Good | — |
| Example 2 | Resin pellets 2 | 0.30 | 0 | 300 | 140 | 0.15 | 0.21 | 0.71 | Good | Good | — |
| Example 3 | Resin pellets 2 | 0.16 | 0 | 300 | 140 | 0.08 | 0.13 | 0.62 | Good | Good | |
| Example 4 | Resin pellets 3 | 0.30 | 0 | 300 | 140 | 0.12 | 0.23 | 0.52 | Good | Average | Slight wrinkles were observed |
| | | | | 200 | 140 | 0.13 | 0.21 | 0.62 | Good | Good | — |
| Example 5 | Resin pellets 2 | 0.71 | 37 | 300 | 150 | 0.31 | 0.51 | 0.61 | Good | Good | — |
| Comp. Example 1 | PLA | 0.30 | 100 | 300 | 150 | 0.18 | 0.22 | 0.82 | Good | Good | — |
| Comp. Example 2 | Resin pellets 4 | 0.30 | 0 | 300 | 140 | 0.10 | 0.24 | 0.42 | Poor | Good | — |
| Comp. Example 3 | Resin pellets 2 | 0.10 | 0 | 300 | 140 | 0.04 | 0.07 | 0.57 | Good | Poor | Some wrinkles were observed |
| Comp. Example 4 | Resin pellets 2 | 1.13 | 51 | 300 | 150 | — | — | — | — | Poor | Shape defect |
| | | | | | 160 | 0.41 | 0.86 | 0.48 | Poor | Poor | Rough surface |

It is seen that the resin sheets for thermoforming which were obtained using poly(3-hydroxybutyrate) resins in Examples 1 to 5 and Comparative Examples 2 to 4 were biodegraded in seawater, whereas the sheet produced using polylactic acid in Comparative Example 1 remained completely non-biodegraded in seawater.

Examples and Comparative Examples reveal that the biodegradation in seawater of the poly(3-hydroxybutyrate) resin sheet for thermoforming becomes more slow with increasing thickness of the sheet.

It is also seen that in each of the molded bodies obtained from the resin sheets for thermoforming of Examples 1 to 5 where the difference between the melting point peak temperature and melting point peak end temperature in the resin material used was 10° C. or more, the corners of the bottom were not significantly thinner than the rest of the molded body despite being stretched to the greatest extent in the thermoforming. Such molded bodies are suitable for use as containers. Additionally, the molded bodies of Examples showed good results in the appearance evaluation.

In Example 4 where the resin used had a melt viscosity as low as less than 10000 poise, thermoforming using the square frame 200 mm on a side yielded a molded body having a good appearance, but thermoforming using the the bottom which were thinned to the greatest extent in the thermoforming, and a desired molded body was not obtained.

In Comparative Example 4 where the thickness of the resin sheet for thermoforming was as large as 1.13 mm, the sheet was not successfully shaped despite the fact that the sheet was preheated until the Thermolabel attached to the surface of the sheet reached a temperature of 150° C. This is presumably because the interior of the sheet was not sufficiently preheated due to the large thickness. In the case where the preheating temperature was further increased to 160° C., the surface of the molded body had a portion roughened due to melting; that is, good appearance and thermoformability were not achieved at the same time.

The invention claimed is:
1. A poly(3-hydroxybutyrate) resin sheet, comprising:
a poly(3-hydroxybutyrate) resin,
wherein a difference between a melting point peak temperature and a melting point peak end temperature in a differential scanning calorimetry analysis of the poly (3-hydroxybutyrate) resin is from 10° C. to 70° C.,
the poly(3-hydroxybutyrate) resin sheet has a thickness of from 0.16 mm to 1 mm, and the poly(3-hydroxybutyrate) resin sheet is suitable for thermoforming.

2. The poly(3-hydroxybutyrate) resin sheet according to claim 1, wherein the poly(3-hydroxybutyrate) resin has a melt viscosity at 160° C. of at least 10,000 poise.

3. The poly(3-hydroxybutyrate) resin sheet according to claim 2, wherein the poly(3-hydroxybutyrate) resin is a mixture of a homopolymer and at least one copolymer, or a mixture of two or more copolymers.

4. The poly(3-hydroxybutyrate) resin sheet according to claim 1, wherein the poly(3-hydroxybutyrate) resin is poly(3-hydroxybutyrate-co-3-hydroxyhexanoate).

5. The poly(3-hydroxybutyrate) resin sheet according to claim 4, wherein in the poly(3-hydroxybutyrate-co-3-hydroxyhexanoate), a molar ratio of 3-hydroxybutyrate unit to 3-hydroxyhexanoate unit is from 80/20 to 99/1.

6. The poly(3-hydroxybutyrate) resin sheet according to claim 4, wherein in the poly(3-hydroxybutyrate-co-3-hydroxyhexanoate), a molar ratio of 3-hydroxybutyrate unit to 3-hydroxyhexanoate unit is from 75/15 to 97/3.

7. The poly(3-hydroxybutyrate) resin sheet according to claim 1, wherein the difference between the melting point peak temperature and the melting point peak end temperature in the differential scanning calorimetry analysis of the poly(3-hydroxybutyrate) resin is from 15° C. to 40° C.

8. The poly(3-hydroxybutyrate) resin sheet according to claim 1, wherein the difference between the melting point peak temperature and the melting point peak end temperature in the differential scanning calorimetry analysis of the poly(3-hydroxybutyrate) resin is from 18° C. to 30° C.

9. The poly(3-hydroxybutyrate) resin sheet according to claim 1, wherein the poly(3-hydroxybutyrate) resin sheet has a thickness of from 0.2 mm to 0.6 mm.

10. The poly(3-hydroxybutyrate) resin sheet according to claim 1, which does not comprise a polylactic acid.

11. The poly(3-hydroxybutyrate) resin sheet according to claim 1, further comprising:
an aliphatic polyester resin, an aliphatic-aromatic polyester resin, or a combination hereof.

12. The poly(3-hydroxybutyrate) resin sheet according to claim 1, wherein the poly(3-hydroxybutyrate) resin has a melt viscosity at 160° C. of 30,000 poise or less.

13. The poly(3-hydroxybutyrate) resin sheet according to claim 1, wherein the poly(3-hydroxybutyrate) resin has a melt viscosity at 160° C. of from 13,000 poise to 30,000 poise.

14. The poly(3-hydroxybutyrate) resin sheet according to claim 1, wherein the poly(3-hydroxybutyrate) resin is a mixture of a homopolymer and at least one copolymer, or a mixture of two or more copolymers.

15. A molded body produced by thermoforming the poly(3-hydroxybutyrate) resin sheet according to claim 1.

16. The molded body according to claim 15, wherein the molded body is a container having a central cavity, a container having a partition, a container having a folded portion around an opening of the container, a lid having a central recess or protrusion, or a lid having a curved or stepped structure along a part or the entire periphery thereof.

17. A method for producing the poly(3-hydroxybutyrate) resin sheet according to claim 1, the method comprising:
melting the poly(3-hydroxybutyrate) resin in an extruder; and then
extruding the molten resin from a T-die.

18. A method for producing the poly(3-hydroxybutyrate) resin sheet according to claim 1, the method comprising:
melting the poly(3-hydroxybutyrate) resin between heating rolls; and then
processing the molten resin into the form of a sheet.

19. A method for producing a molded body, the method comprising:
preheating the poly(3-hydroxybutyrate) resin sheet according to claim 1 to a temperature between the melting point peak temperature and the melting point peak end temperature in the differential scanning calorimetry analysis of the poly(3-hydroxybutyrate) resin; and then
molding the preheated sheet.

20. The method according to claim 19, wherein the molding is performed by a vacuum forming process, a compressed-air forming process, or a vacuum/compressed-air forming process.

* * * * *